United States Patent
Mizuno

(10) Patent No.: US 7,813,253 B2
(45) Date of Patent: Oct. 12, 2010

(54) DVD-RAM DISC DISCRIMINATIVE REPRODUCING DEVICE

(75) Inventor: Takao Mizuno, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 1008 days.

(21) Appl. No.: 11/594,220

(22) Filed: Nov. 8, 2006

(65) Prior Publication Data

US 2007/0115793 A1   May 24, 2007

(30) Foreign Application Priority Data

Nov. 24, 2005   (JP)   .............................. 2005-338625

(51) Int. Cl.
G11B 7/00   (2006.01)

(52) U.S. Cl. .............................. 369/124.11; 369/44.29; 369/53.31; 369/53.37; 369/59.15

(58) Field of Classification Search ............ 369/124.11, 369/53.2, 53.22, 44.29, 166, 53.3, 53.31, 369/59.15, 59.17, 59.26, 53.37, 53.45, 59.16
See application file for complete search history.

(56) References Cited

U.S. PATENT DOCUMENTS

| | | | |
|---|---|---|---|
| 6,816,443 B1 * | 11/2004 | Hwang | 369/44.32 |
| 6,891,782 B1 * | 5/2005 | Saito et al. | 369/44.29 |
| 2002/0114249 A1 * | 8/2002 | Kato et al. | 369/59.17 |
| 2003/0043714 A1 * | 3/2003 | Takeda | 369/47.53 |
| 2003/0179676 A1 * | 9/2003 | Ito | 369/53.22 |
| 2004/0090883 A1 * | 5/2004 | Lee et al. | 369/44.29 |

FOREIGN PATENT DOCUMENTS

| | | |
|---|---|---|
| JP | A-2000-285582 | 10/2000 |
| JP | A-2004-046977 | 2/2004 |
| JP | A-2005-038514 | 2/2005 |

* cited by examiner

*Primary Examiner*—Wayne R Young
*Assistant Examiner*—Linh T Nguyen
(74) *Attorney, Agent, or Firm*—Morgan, Lewis & Bockius LLP

(57) ABSTRACT

The gain controlling portion sets a gain of an RF amplifier to a maximum range when an activation process starts for an optical disk. The binary process condition setting portion sets an upper threshold level and a lower threshold level corresponding to 80% of upper and lower levels of the maximum range as the binary process condition for the binary process portion. A vacant part without a signal between the upper threshold level and the lower threshold level corresponds to a part of a CAPA signal. The binary signal ratio calculating portion measures a time period of a binary signal from a binary process portion that performs a binary process on the vacant part, and it calculates a binary signal ratio indicating a ratio of the time period of the binary signal to a time period corresponding to one rotation of the optical disk. The disk discriminating portion determines that the loaded optical disk is a DVD-RAM if the binary signal ratio is a value within the range of 4±1 %.

3 Claims, 4 Drawing Sheets

DVD-RAM DISC DISCRIMINATIVE REPRODUCING DEVICE

This application is based on Japanese Patent Application No. 2005-338625 filed on Nov. 24, 2005, the contents of which are hereby incorporated by reference.

BACKGROUND OF THE INVENTION

1. Field of the Invention

The present invention relates to an optical disk reproducing device for reproducing information recorded on an optical disk. In particular, the present invention relates to a process for discriminating a type of an optical disk loaded to the optical disk reproducing device.

2. Description of Related Art

Recently, a digital versatile disk (DVD) that is an optical disk capable of recording and reproducing a large quantity of video and audio information than a compact disc (CD) has become commonplace. The DVD is in the limelight as a recording medium in the next generation because it has good image quality of pictures to be reproduced. There are several types of the DVD includes a DVD-ROM that stores information recorded on a manufacture's side and cannot be rewritten on a user's side, a DVD-R and a DVD+R on which information can be written only once on the user's side, and a DVD-RW, a DVD+RW and a DVD-RAM on which information can be rewritten a predetermined number of times on the user's side.

There is known a conventional technique of an optical disk discriminating device as disclosed in JP-A-2004-46977, for example. This device is used for discriminating a DVD-RAM from the various types of DVD described above when the DVD-RAM is loaded to an optical disk reproducing device. This optical disk discriminating device determines that the loaded optical disk is the DVD-RAM by detecting address pit (CAPA) from the number of times and an interval of short pulse signals obtained by a binary process performed on a total reflection sum signal obtained from reflection light received by an optical pickup.

In addition, JP-A-2005-38514 discloses another conventional technique of the optical disk discriminating device. The device detects a peak value and a bottom value of the total reflection sum signal obtained from the reflection light received by the optical pickup, and it compares a difference quantity between them with a reference level for detecting the address pit (CAPA) so as to determine whether or not the optical disk is the DVD-RAM.

In addition, JP-A-2000-285582 discloses another conventional technique of the optical disk discriminating device and method. The device or the method detects an RF signal read out from the disk in an off-track state in which only focusing prior to tracking control is performed, so that an amplitude of a generated envelope signal is detected. Further, the amplitude of the envelope signal is compared with a reference level. Based on a result of this comparison, it is determined whether or not the optical disk is the DVD-RAM.

However, the conventional technique disclosed in JP-A-2004-46977 has a following disadvantage. As described above, this technique detects the address pit (CAPA) from the number of times and an interval of short pulse signals obtained by a binary process performed on a total reflection sum signal. Because of a variation in an amplitude of an output signal of the optical pickup, a variation of reflectance of the optical disk or a variation of gain in a total reflection sum signal generating portion, an amplitude of the total reflection sum signal outputted from the total reflection sum signal generating portion may be varied. As a result, it becomes difficult to detect the address pit (CAPA) correctly since the binary process of the total reflection sum signal becomes hard to perform correctly. In this case, it may be difficult to discriminate the DVD-RAM correctly.

The conventional technique disclosed in JP-A-2005-38514 detects a peak value and a bottom value of the total reflection sum signal as described above, and it compares a difference quantity between them with a reference level for detecting the address pit (CAPA). In this case too, an amplitude of the total reflection sum signal outputted from the total reflection sum signal generating portion may be varied due to a variation in an amplitude of an output signal of the optical pickup, a variation in a reflectance of the optical disk or a variation in a gain in a total reflection sum signal generating portion. As a result, it becomes difficult to compare a difference quantity between a peak value and a bottom value of the total reflection sum signal with the reference level correctly, and it becomes difficult to detect the address pit (CAPA) correctly. In this case too, it may be difficult to discriminate the DVD-RAM correctly.

In addition, the conventional technique disclosed in JP-A-2000-285582 detects an amplitude of the envelope signal generated by detecting the RF signal as described above, and it further compares the amplitude of the envelope signal with a reference level so as to determine whether or not the optical disk is the DVD-RAM based on a result of the comparison. If there is a variation in the amplitude of the output signal from the optical pickup, a variation in a reflectance of the optical disk or a variation in a gain in the RF amplifier, an amplitude of the envelope signal may vary so that reliability of the result of the comparison with the reference level may be lowered. As a result, it may be difficult to determine that the optical disk is the DVD-RAM correctly.

SUMMARY OF THE INVENTION

An object of the present invention is to provide an optical disk reproducing device that can discriminate a DVD-RAM correctly even if there is a variation in an amplitude of an output signal from the optical pickup, a variation in a reflectance of the optical disk or a variation in a gain of an RF amplifier.

An optical disk reproducing device according to the present invention includes a gain controlling portion for setting a gain of an RF amplifier to a maximum range when the optical disk is discriminated during its activation, the RF amplifier amplifying an RF signal from an optical pickup that emits a laser beam toward the optical disk and receives reflected light so as to output the RF signal as a read signal; a binary process portion for performing a binary process on the RF signal from the RF amplifier in accordance with a predetermined binary process condition so as to output a binary signal indicating a detection of a disk unique signal contained in the RF signal; a binary process condition setting portion for setting a binary process condition for the binary process portion, the binary process condition being an upper threshold level and a lower threshold level corresponding to levels of upper and lower predetermined percentages of the maximum range in order to perform the binary process on the disk unique signal contained in the RF signal in accordance with whether or not the RF signal makes up the upper and lower predetermined percentages of the maximum range; a binary signal ratio calculating portion for calculating a binary signal ratio indicating a ratio of a time period of the binary signal to a time period corresponding to one rotation of the disk by measuring a time period of the binary signal from the binary process portion obtained by performing the binary process on a vacant part without a signal between the upper threshold level and the lower threshold level; and a disk discriminating portion for discriminating the optical disk in accordance with the calculated binary signal ratio.

In this structure, when an optical disk is loaded so that an activation process starts for the optical disk, the gain controlling portion sets a gain of the RF amplifier to a maximum range. In addition, the binary process condition setting portion sets an upper threshold level and a lower threshold level corresponding to levels of upper and lower predetermined percentages of the maximum range as the binary process condition for the binary process portion in order to perform the binary process on the disk unique signal contained in the RF signal in accordance with whether or not the RF signal from the RF amplifier makes up the upper and lower predetermined percentages of the maximum range. The binary process portion performs the binary process on the RF signal from the RF amplifier in accordance with the set binary process condition. The binary signal ratio calculating portion measures a time period of the binary signal from the binary process portion obtained by performing the binary process on a vacant part without a signal between the upper threshold level and the lower threshold level, and it calculates a binary signal ratio indicating a ratio of a time period of the binary signal to a time period corresponding to one rotation of the disk. After that, the disk discriminating portion discriminates the optical disk in accordance with the calculated binary signal ratio. Since the disk unique signals are different depending on types of the optical disk, the binary signal ratios are also different so that the optical disk can be discriminated.

According to this structure, the gain of the RF amplifier is set to a maximum range, and the RF signal containing the disk unique signal is supplied to the RF amplifier. Then, a part of the disk unique signal contained in the RF signal that is an output signal of the RF amplifier becomes vacant, so the binary process can be performed on this vacant part correctly. Since the binary signal ratio indicating a ratio of a time period of the binary signal to a time period corresponding to one rotation of the disk is calculated by measuring a time period of the signal of the binary process so that a type of the optical disk is discriminated based on the binary process ratio, the type of the optical disk can be discriminated correctly even if there is a variation in an amplitude of an output signal from the optical pickup, a variation in a reflectance of the optical disk or a variation in a gain of an RF amplifier.

In a preferred embodiment of the present invention, the disk unique signal is a CAPA signal if the optical disk is the DVD-RAM. Therefore, if the CAPA signal is detected, it can be determined that the optical disk is the DVD-RAM.

In another preferred embodiment of the present invention, if the disk unique signal is the CAPA signal, the disk discriminating portion determines whether or not the calculated binary signal ratio is a predetermined ratio indicating the CAPA signal, and it determines that the optical disk is the DVD-RAM if the binary signal ratio is the predetermined ratio indicating the CAPA signal, while it determines that the optical disk is an optical disk other than the DVD-RAM if the binary signal ratio is not the predetermined ratio indicating the CAPA signal. Therefore, it is possible to determine whether the optical disk is the DVD-RAM or other optical disk.

As described above, according to the present invention, a gain of the RF amplifier is set to a maximum range, and the RF signal containing the disk unique signal is supplied to the RF amplifier. Then, a part of the disk unique signal contained in the RF signal that is an output signal of the RF amplifier becomes vacant, so the binary process can be performed on the vacant part correctly. By measuring a time period of the signal of the binary process, a ratio of a time period of the binary signal to a time period corresponding to one rotation of the disk is calculated so that a type of the optical disk can be discriminated based on the binary process ratio. Thus, the type of the optical disk can be discriminated correctly even if there is a variation in an amplitude of an output signal from the optical pickup, a variation in a reflectance of the optical disk or a variation in a gain of the RF amplifier.

DESCRIPTION OF THE PREFERRED EMBODIMENTS

Figure 1:
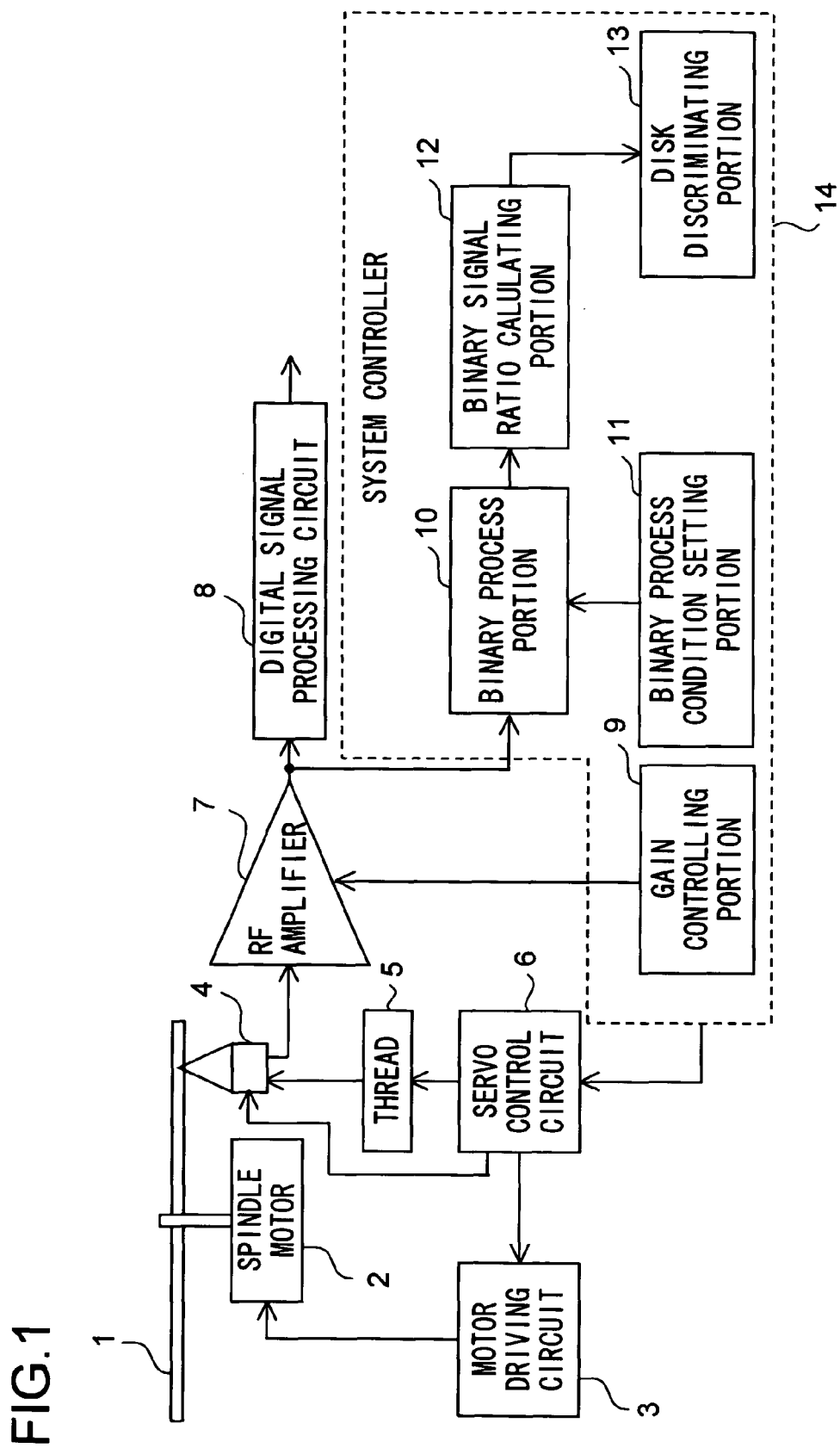
FIG. 1 is a block diagram for explaining a structure of a disk discriminating function of an optical disk reproducing device according to an embodiment of the present invention.

Now, an embodiment of the present invention will be described with reference to the attached drawings. FIG. 1 is a block diagram for explaining a structure of a disk discriminating function of an optical disk reproducing device according to an embodiment of the present invention.

This optical disk reproducing device is equipped with a system controller 14 for controlling the entire of the device, a spindle motor 2 for rotating an optical disk 1, a motor driving circuit 3 for driving the spindle motor 2, an optical pickup 4 for emitting a laser beam toward the optical disk 1 and receiving reflected light so as to output an RF signal as a read signal, a thread 5 for moving the optical pickup 4 in the radial direction of the optical disk 1, and a servo control circuit 6 for rotating the spindle motor 2 via the motor driving circuit 3, driving the thread 5 and moving an objective lens (not shown) embedded in the optical pickup 4 so that a focus position of the laser beam is moved with respect to a recording surface of the optical disk 1 in the vertical direction and in the horizontal direction, and performing a tilt control of the optical pickup 4, in accordance with an instruction from the system controller 14.

In addition, this optical disk reproducing device includes an RF amplifier 7 for amplifying the RF signal that is a read signal from the optical pickup 4 when the optical disk 1 is read, and a digital signal processing circuit 8 for outputting reproduced data by converting the RF signal outputted from the RF amplifier 7 into digital data followed by a signal modulating process and an error correcting process in accordance with a data format of the optical disk 1.

The system controller 14 includes a gain controlling portion 9 for setting a gain of the RF amplifier 7 to a maximum range when the optical disk 1 is discriminated during its activation, a binary process portion 10 for performing a binary process on the RF signal from the RF amplifier 7 in accordance with a predetermined binary process condition so as to output a binary signal indicating a detection of a CAPA signal if the CAPA signal is contained in the RF signal, a binary process condition setting portion 11 for setting a binary process condition for the binary process portion, which is an upper threshold level and a lower threshold level corresponding to levels of upper and lower predetermined percentages (e.g., upper and lower 80%) of the maximum range in order to perform the binary process on the CAPA signal contained in the RF signal in accordance with whether or not the RF signal makes up the upper and lower predetermined percentages (e.g., upper and lower 80%) of the maximum range, a binary signal ratio calculating portion 12 for calculating a binary signal ratio indicating a ratio of a time period of the binary signal to a time period corresponding to one rotation of the disk by measuring a time period of the binary signal from the binary process portion 10 obtained by performing the binary process on a vacant part without a signal between the upper threshold level and the lower threshold level, and a disk discriminating portion 13 for determining whether or not the calculated binary signal ratio is a predetermined ratio indicating the CAPA signal (e.g., within the range of 4±1%), and for determining that the loaded optical disk 1 is a DVD-RAM if the binary signal ratio is the predetermined ratio indicating the CAPA signal while determining that the loaded optical disk 1 is an optical disk other than the DVD-RAM if the binary signal ratio is not the predetermined ratio indicating the CAPA signal.

Figure 2:
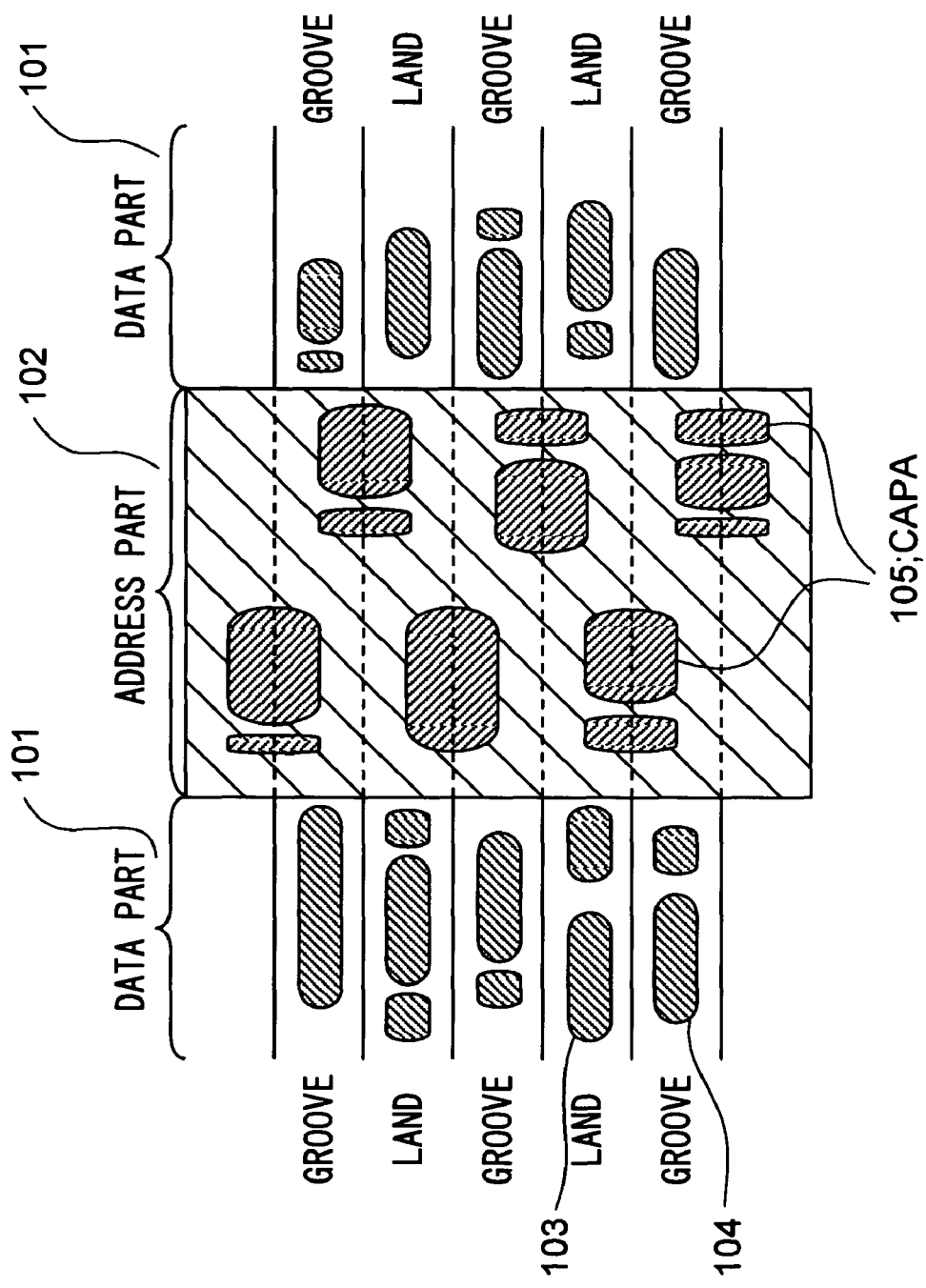
FIG. 2 is a diagram for explaining a recording format on a DVD-RAM.

FIG. 2 is a diagram for explaining a recording format on a DVD-RAM. The optical disk of the DVD-RAM has a CAPA formed on a data track in advance. It also has a sector format structure, and data parts 101 are separated from address parts 102 physically. The data part 101 is made up of protruding lands 103 and recessed grooves 104, and information is recorded along a track of the land 103 or the groove 104.

A phase change recording method is used for recording information, in which bit information is recorded in association with a crystalline state or an amorphous state of a medium material. Since a quantity of reflected light varies in accordance with the crystalline state, the recorded information can be read. The address part 102 is formed in a CAPA 105, and the recorded information can be read as a quantity of reflected light varies due to diffraction. The CAPA 105 is a part having a high reflectance indicating address information. The CAPA 105 is formed by embossing process (information is recorded on the manufacture's side in advance) at a ratio of approximately 4% of a circle of the disk 1, and its record position is located between the tracks of the land 103 and the groove 104 alternately. A diffraction reception direction of the CAPA 105 is different between the case where a laser spot scans the land 103 and the case where it scans the groove 104. Therefore, this diffraction reception direction is detected and is used for determination of an address position and determination of land or groove.

The DVD-RAM enables random recording and random reproduction, an access to data areas on an unused optical disk, prevention of a data loss during rewriting data, detection of the center of a data track and the like. In addition, the CAPA 105 of the DVD-RAM is an area on which information is recorded when the optical disk is manufactured and cannot be rewritten after that. Therefore, the area is made of a material different from a phase change medium material of the data part that forms the lands 103 and the grooves 104. It is a material similar to that of a DVD-ROM having a high reflectance. Therefore, in order to record and reproduce information on the DVD-RAM, it is necessary to use a special process for canceling an offset of a high reflection signal in the CAPA 105. This is one of the factors that the DVD-RAM cannot have compatibility with other types of the DVD. In this embodiment, the high reflectance of the CAPA 105 is utilized for determining that the loaded optical disk 1 is the DVD-RAM.

Figure 3:
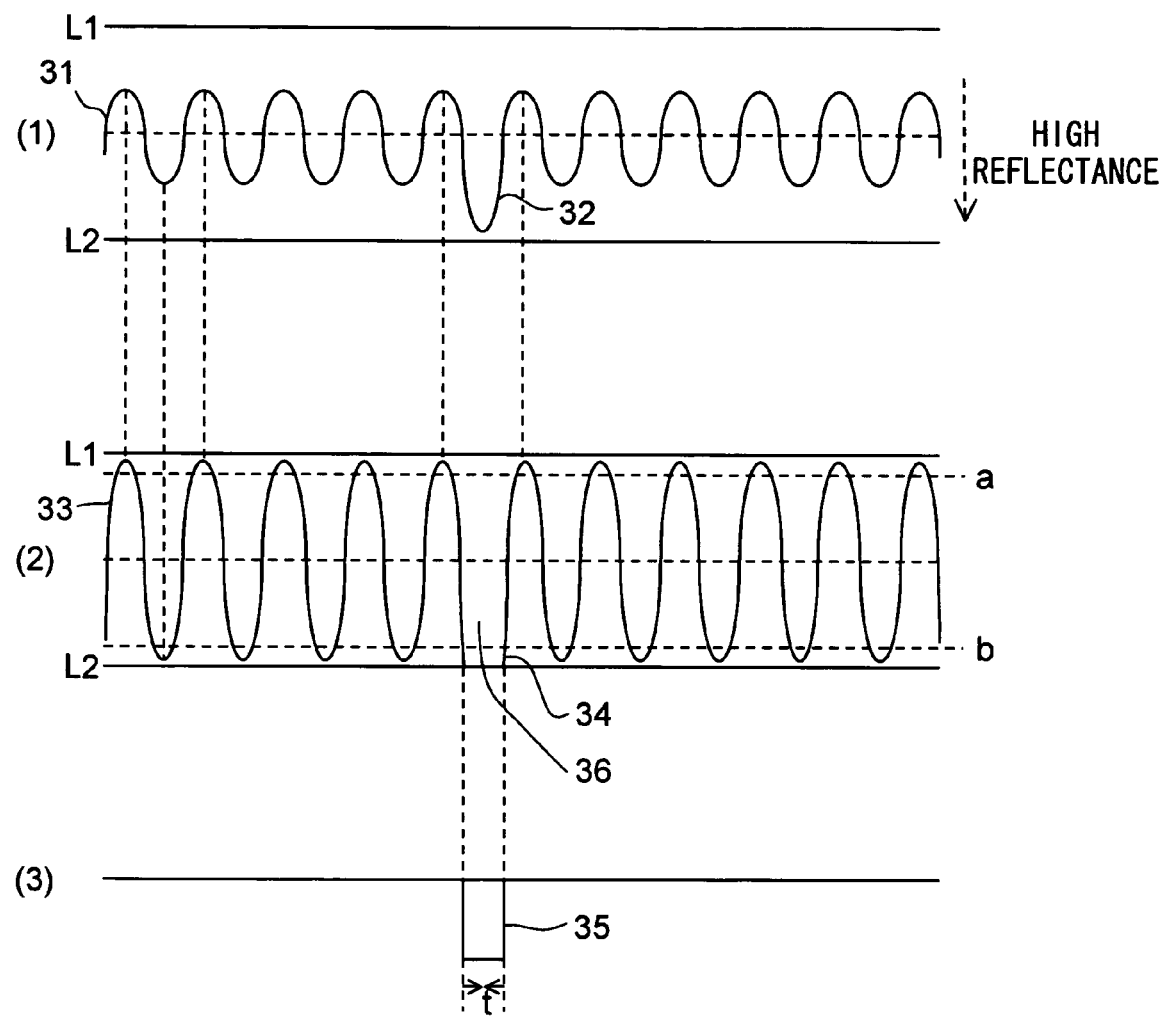
FIG. 3 is a signal waveform diagram for explaining a binary process performed on a CAPA signal that is used for a disk discriminating process in the embodiment.

FIG. 3 is a signal waveform diagram for explaining a binary process performed on the CAPA signal that is used for a disk discriminating process in this embodiment.

In a section (1) of FIG. 3, L1 indicates an upper range level in the case where the gain of the RF amplifier 7 (see FIG. 1) is the maximum range, while L2 indicates a lower range level in the case where the gain of the RF amplifier 7 is the maximum range. Numeral 31 indicates an RF signal that is an output signal of the RF amplifier 7 in the case where the gain of the RF amplifier 7 is set normally. Numeral 32 indicates the CAPA signal contained in the RF signal 31. As shown in the section (1) of FIG. 3, the CAPA signal contained in the RF signal 31 is located between the upper range level L1 and the lower range level L2.

In a section (2) of FIG. 3, L1 indicates an upper range level in the case where the gain of the RF amplifier 7 is the maximum range, while L2 indicates a lower range level in the case where the gain of the RF amplifier 7 is the maximum range. Numeral 33 indicates an RF signal that is an output signal of the RF amplifier 7 in the case where the gain of the RF amplifier 7 is set to the maximum range. Numeral 34 indicates the CAPA signal contained in the RF signal 33. Reference symbol "a" and "b" indicate the upper threshold level and the lower threshold level corresponding to levels of upper and lower predetermined percentages (upper and lower 80%) of the maximum range in order to perform the binary process on the CAPA signal 34 contained in the RF signal 33 in accordance with whether or not the RF signal 33 makes up the upper and lower predetermined percentages (upper and lower 80%) of the maximum range.

In a section (3) of FIG. 3, numeral 35 denotes the binary signal obtained by the binary process on the vacant part 36 (see the section (2) of FIG. 3) without a signal between the upper threshold level "a" and the lower threshold level "b", and in this case it indicates a pulse having a low level during a time period "t". This binary signal 35 is a signal outputted from the binary process portion 10 (see FIG. 1). The binary signal 35 outputted from the binary process portion 10 is used for calculating the binary signal ratio indicating a ratio of a time period "t" of the binary signal 35 to a time period corresponding to one rotation of the disk 1 by measuring a time period "t" of the binary signal 35 during its low level.

Figure 4:
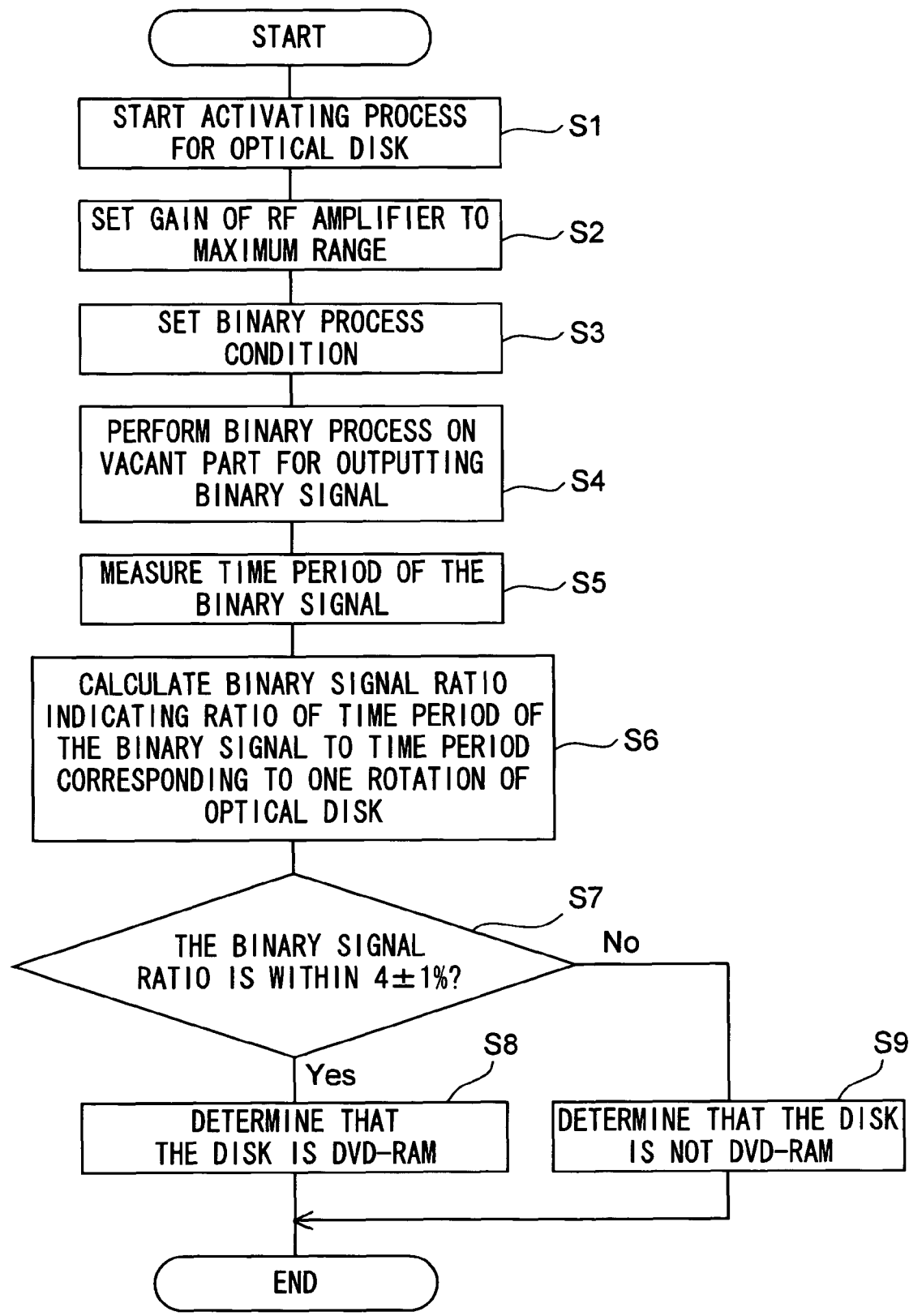
FIG. 4 is a flowchart for explaining a process of determining whether or not a loaded optical disk is a DVD-RAM in the embodiment.

FIG. 4 is a flowchart for explaining a process of determining whether or not a loaded optical disk is a DVD-RAM in this embodiment. With reference to this flowchart and FIGS. 1-3, a process for determining whether or not the loaded optical disk is the DVD-RAM will be described.

When the optical disk 1 is loaded, an activating process is started for the optical disk 1 (Step S1). More specifically, the system controller 14 drives the motor driving circuit 3 via the servo control circuit 6 so as to rotate the spindle motor 2, and it drives the thread 5 via the servo control circuit 6 so as to move the optical pickup 4 in the radial direction of the optical disk 1 to be set to an initial position. It also moves an objective lens (not shown) embedded in the optical pickup 4 via the servo control circuit 6 so as to move the laser beam in the vertical direction and the horizontal direction with respect to a recording surface of the optical disk 1 so that its focus point is set to an appropriate position, and it also performs a tilting control of the optical pickup 4.

When this activating process is started for the optical disk 1, the gain controlling portion 9 of the system controller 14 sets the gain of the RF amplifier 7 that amplifies the RF signal from the optical pickup 4 to the maximum range (Step S2). Note that the gain of the RF amplifier 7 will be reset to the original value after the disk discrimination. After the gain of the RF amplifier 7 is set to the maximum range, the binary process condition setting portion 11 of the system controller 14 sets the upper threshold level "a" and the lower threshold level "b" corresponding to levels of upper and lower 80% of the maximum range as the binary process condition for the binary process portion 10 in order to perform the binary process on the CAPA signal contained in the RF signal in accordance with whether or not the RF signal from the RF amplifier 7 makes up the upper and lower 80%, for example (Step S3).

The binary process portion 10 performs the binary process on the RF signal from the RF amplifier 7 in accordance with the set binary process condition. If the RF signal contains the CAPA signal, the binary process portion 10 outputs the binary signal indicating a detection of the CAPA signal. More specifically, the binary process portion 10 outputs the binary signal 35 (see the section (3) of FIG. 3) having a low level during the time period (a pulse width) "t" by performing the binary process on the vacant part 36 (see the section (2) of FIG. 3) without a signal between the upper threshold level "a" and the lower threshold level "b" (Step S4). This binary signal becomes the high level if there is a signal between the upper threshold level "a" located at the upper 80% of the maximum range of the RF amplifier 7 and the lower threshold level "b" located at the lower 80% of the maximum range of the RF amplifier 7, while it becomes the low level if there is no signal between them. In other words, if the RF signal contains the CAPA signal, this CAPA signal is regarded to be vacant without a signal between the upper threshold level "a" and the lower threshold level "b", so the binary signal 35 when the CAPA signal is detected becomes the low level. Note that although the binary signal 35 becomes the high level if there is a signal between the upper threshold level "a" and the lower threshold level "b" while it becomes the low level if there is no signal between them in this example, it is possible that the signal becomes the high level if there is no signal while it becomes the low level if there is a signal.

Next, the binary signal ratio calculating portion 12 measures the time period "t" of the binary signal 35 from the binary process portion 10 obtained by performing the binary process on the vacant part 36 without a signal between the upper threshold level "a" and the lower threshold level "b" (Step S5), and it calculates the binary signal ratio indicating a ratio of a time period "t" of the binary signal 35 to a time period corresponding to one rotation of the disk 1 (Step S6). This binary signal ratio indicates a ratio of the binary signal 35 to one circle of the optical disk 1. For example, supposing that the time period of one rotation of the optical disk 1 is "T" and the time period of the binary signal 35 is "t", the binary signal ratio can be obtained as "t/T". If the optical disk 1 is the DVD-RAM, the binary signal 35 indicates a detection signal of the CAPA signal, and t/T should be a value within 4±1%.

After that, the disk discriminating portion 13 determines whether or not the binary signal ratio calculated by the binary signal ratio calculating portion 12 is a value within 4±1% that indicates a detection of the CAPA signal (Step S7). If the binary signal ratio is a value within 4±1%, it is determined that the loaded optical disk 1 is the DVD-RAM (Step S8). If the binary signal ratio is not a value within 4±1%, it is determined that the loaded optical disk 1 is an optical disk other than the DVD-RAM (Step S9).

After this discrimination of a type of the loaded optical disk, the system controller 14 controls the optical disk reproducing device to perform the reproducing operation in accordance with the type of the optical disk.

As described above, according to this embodiment, the gain of the RF amplifier 7 is set to the maximum range, and the RF signal containing the CAPA signal is inputted to the RF amplifier 7. Then, a part of the CAPA signal contained in the RF signal that is an output signal of the RF amplifier 7 becomes vacant, so the binary process can be performed on this vacant part correctly. The time period of the binary signal is measured for calculating a ratio of the time period of the binary signal to a time period corresponding to one rotation of the optical disk 1, and the determination whether or not the optical disk is the DVD-RAM is performed based on this ratio. Therefore, the discrimination of the DVD-RAM can be performed correctly even if there is a variation in an amplitude of an output signal of the optical pickup 4, a variation in a reflectance of the optical disk 1 or a variation in a gain of an RF amplifier 7.

What is claimed is:

1. An optical disk reproducing device optical disk for reproducing information recorded on an optical disk, the device comprising:

a gain controlling portion for setting a gain of an RF amplifier to a maximum range when the optical disk is discriminated during its activation, the RF amplifier amplifying an RF signal from an optical pickup that emits a laser beam toward the optical disk and receives reflected light so as to output the RF signal as a read signal;

a binary process portion for performing a binary process on the RF signal from the RF amplifier in accordance with a predetermined binary process condition so as to output a binary signal indicating a detection of a disk unique signal contained in the RF signal;

a binary process condition setting portion for setting a binary process condition for the binary process portion, the binary process condition being an upper threshold level and a lower threshold level corresponding to levels of upper and lower predetermined percentages of the maximum range in order to perform the binary process on the disk unique signal contained in the RF signal in accordance with whether or not the RF signal makes up the upper and lower predetermined percentages of the maximum range;

a binary signal ratio calculating portion for calculating a binary signal ratio indicating a ratio of a time period of the binary signal to a time period corresponding to one rotation of the disk by measuring a time period of the binary signal from the binary process portion obtained by performing the binary process on a vacant part without a signal between the upper threshold level and the lower threshold level; and a disk discriminating portion for discriminating the optical disk in accordance with the calculated binary signal ratio.

2. The optical disk reproducing device according to claim 1, wherein the disk unique signal is a complementary allocated pit address (CAPA) signal if the optical disk is a Digital Versatile Disk—Random Access Memory (DVD-RAM).

3. The optical disk reproducing device according to claim 1, wherein if the disk unique signal is a complementary allocated pit address (CAPA) signal, the disk discriminating portion determines whether or not the calculated binary signal ratio is a predetermined ratio indicating the CAPA signal, and it determines that the optical disk is a Digital Versatile Disk—Random Access Memory (DVD-RAM) if the binary signal ratio is the predetermined ratio indicating the CAPA signal, while it determines that the optical disk is an optical disk other than the DVD-RAM if the binary signal ratio is not the predetermined ratio indicating the CAPA signal.

* * * * *